United States Patent [19]

Easterwood

[11] Patent Number: 5,330,313
[45] Date of Patent: Jul. 19, 1994

[54] SPARE TIRE HOIST ANTI-THEFT DEVICE

[76] Inventor: Doris E. Easterwood, 2517 Slagestand, Duncan, Okla. 73533

[21] Appl. No.: 43,694

[22] Filed: Apr. 8, 1993

[51] Int. Cl.$^5$ .............................................. B62D 43/04
[52] U.S. Cl. ................................. 414/463; 70/259; 224/42.25
[58] Field of Search .............. 70/259, 260; 224/42.06, 224/42.23, 42.25; 414/463

[56]  References Cited
U.S. PATENT DOCUMENTS

| | | | |
|---|---|---|---|
| 3,952,894 | 4/1976 | Mendez | 224/42.23 |
| 4,537,555 | 8/1985 | Combs | 414/463 |
| 4,988,023 | 1/1991 | Heathcoat | 224/42.21 |
| 5,077,995 | 1/1992 | Appelbaum | 70/259 |
| 5,199,287 | 4/1993 | McClary | 224/42.21 X |
| 5,211,043 | 5/1993 | Langdon | 224/42.25 X |

Primary Examiner—Michael S. Huppert
Assistant Examiner—Janice Krizek
Attorney, Agent, or Firm—Robert K. Rhea

[57] ABSTRACT

In a vehicle having a spare tire and wheel assembly supported adjacent the depending rearward limit thereof by a cable hoist operated by a rearwardly projected hoist shaft terminating adjacent the rearward bumper of the vehicle. A lockable shaft is extended through the bumper and engages the rearward end of the shaft for receiving a lock and preventing access to the rearward end of the hoist shaft. A sleeve surrounds the lockable shaft and an elongated sleeve surrounds the hoist shaft in shielding relation preventing access thereto by an unauthorized person.

4 Claims, 1 Drawing Sheet

SPARE TIRE HOIST ANTI-THEFT DEVICE

This invention relates to vehicle spare tire hoisting devices and more particularly to apparatus preventing access to the spare tire secured by a hoist on the under side of a vehicle.

BACKGROUND OF THE INVENTION

1. Field of the Invention

In many models of pickup trucks, a spare tire is stored and suspended adjacent the under side of the pickup truck bed adjacent the rearward end thereof. This is accomplished by a hoist equipped carrier which engages the spare tire including a cable extending therefrom and a rotative drive arranged upon a first axis connected to the cable for selectively extending and retracting the cable. Selective rotation of the rotative drive winds the cable up or extends it for alternately raising or lowering the spare tire.

The hoist mechanism includes a rearwardly extending crankshaft having a socket at its rearward end to be engaged in driving relationship by a portable crank inserted through a hole in the rear bumper and engaging the crankshaft for rotating the rotative drive winding up or paying out the cable. However, substitute handles have frequently been used by unauthorized persons for lowering the spare tire and carrier.

Further a crankshaft of such a spare tire hoist may be engaged, as by a pipe wrench or the like, and angularly rotated by an unauthorized person. In some spare tire hoist installations, the cable is exposed and may be cut, as by a bolt cutter, thus, allowing unauthorized access to the spare tire.

This invention shields the spare tire raising and lowering mechanism against unauthorized access thereto.

2. Description of the Prior Art

The most pertinent prior patent is believed to be U.S. Pat. No. 5,077,995, issued Jan. 7, 1992, to Appelbaum for LOCK FOR SPARE TIRE HOIST. This patent provides a locking mechanism which extends between the rearward end of the socket equipped cable actuating shaft and the access hole in a pickup truck bumper.

The present invention is distinctive over this and similar hoist lock shielding patents by providing a lockable shaft extending through the bumper access opening the rearward end of the cable winding up and paying out shaft in which sleeves surround the lock shaft and cable actuating crankshaft precluding access to the lock, as by a bolt cutter, and preventing access to the lock shaft and crankshaft.

U.S. Pat. No. 3,952,894, issued Apr. 27, 1976, to Mendez for SPARE TIRE HOIST and U.S. Pat. No. 4,537,555, issued Aug. 27, 1985, to Combs for WIRE ROPE SPARE TIRE CARRIER are examples of the further state-of-the-art.

The Mendez patent features a crankshaft journalled by the vehicle frame which includes hook equipped cables engageable with the wheel of a spare tire and secured to the crankshaft which when rotated in respective directions winds up or pays out the cable for raising and lowering a spare tire relative to the vehicle frame.

The Combs patent discloses pulleys and a cable arrangement connected at one end with a spare tire and its other end with a lever mounted on the rearward bumper in which pivotal movement of the lever extends and retracts the cable to lower or raise the spare tire.

SUMMARY OF THE INVENTION

A pickup truck is provided with a gear box located under the rearward end of the pickup bed forwardly of the rear bumper and supported by the frame to pay out and wind up a wire cable centrally attached to the wheel spare tire.

The cable is payed out and rewound by a cranking shaft connected with the gear box and terminating adjacent the rearward frame cross member forwardly of the rear bumper.

The bumper is provided with an aperture in alignment with the cranking shaft so that a wheel lug nut wrench may be engaged with the cranking shaft for rotating the latter and paying out or retracting the cable for lowering or raising the spare wheel/tire relative to the bottom surface of the truck frame.

A short locking shaft is inserted through an access aperture in the bumper and enters the rearward end portion of the cranking shaft. The short shaft is being provided with an aperture receiving the hasp of a lock disposed between the bumper and the rearward frame cross member to minimize the space adjacent to the lock.

Further, a short sleeve surrounds the locking shaft between the rearward frame member and the forward surface of the rear bumper. Similarly, an elongated shaft surrounds the cranking shaft between the gear box and the forward surface of the rearward frame member preventing access to the cranking shaft.

The principal object is to prevent access to the cranking shaft or lock securing a spare tire on the under side of a vehicle.

DESCRIPTION OF THE PREFERRED EMBODIMENTS

Figure 2:
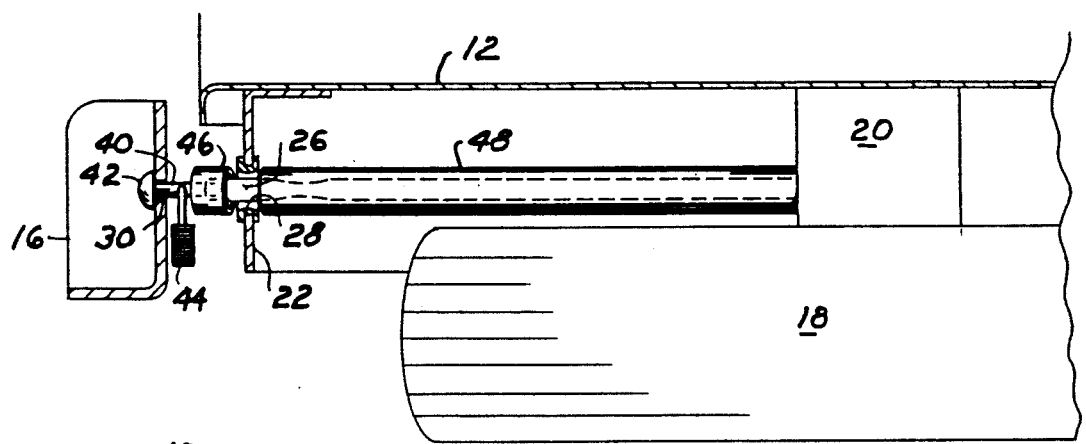
FIG. 2 is a side elevational view partly in section, to a larger scale, illustrating the position of the apparatus relative to the bumper and rearward frame cross member; and, FIG. 3 is a top view partially in section illustrating the apparatus in operative position.
Figure 1:
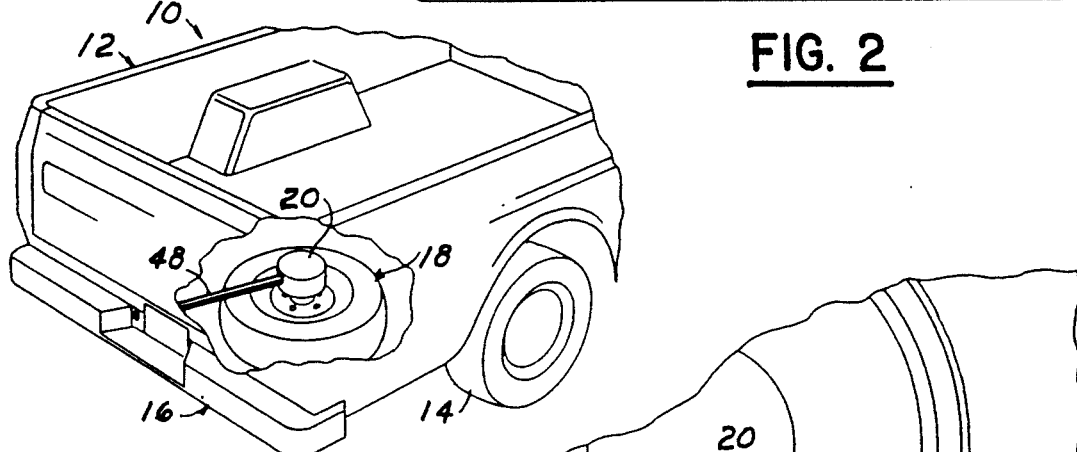
FIG. 1 is a fragmentary perspective view of the rearward portion of a pickup truck with parts broken away illustrating the invention installed on a spare tire hoist carrier.
Figure 3:
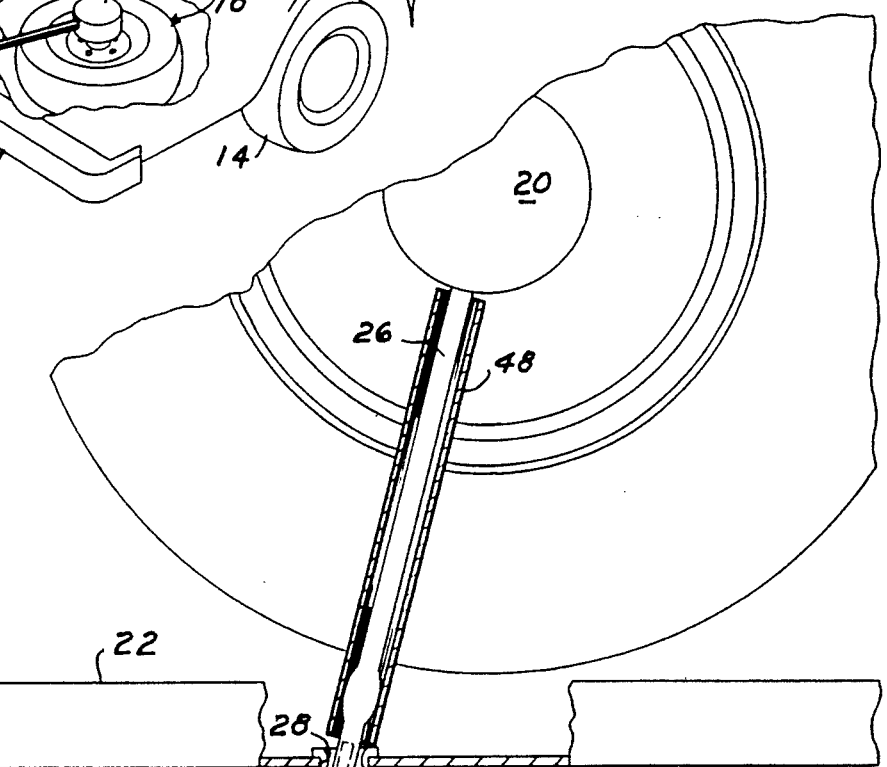

Like characters of reference designate like parts in those figures of the drawings in which they occur.

In the drawings:

The reference numeral 10 indicates a fragment of a pickup truck having a pickup bed 12 extending rearwardly of the vehicle rearward wheels 14, only one being shown, and having a rearward bumper 16 rearwardly of the pickup bed 12.

A spare tire and wheel 18 is supported adjacent the depending limit of the pickup bed frame by a hoist unit 20 winding up and paying out a cable, not shown, centrally attached to the spare tire and wheel 18. The cable is wound up or payed out by angular rotation of a shaft 26 operatively secured at one end to the unit 20 and projecting at its rearward end through a grommet equipped aperture 28 in a rearward frame cross member 22. The rearward end portion of the shaft normally has a wrench receiving socket.

The bumper 16 is provided with an aperture 30 in substantial alignment with the frame aperture 28 permitting a suitable wrench, not shown, to enter the bumper opening 30 and engage the rearward end portion of the shaft 26 for winding up or paying out the cable and raising or lowering the spare tire and wheel toward and away from the surface of the earth.

The above description is substantially conventional with many types of pickup trucks now presently on the market and is set forth to show the combination with which the present invention is intended to be used.

To secure the spare tire and wheel and access to its actuating shaft 26, a lockable shaft 40, having a length sufficient to extend between the bumper 16 and the rearward end portion of the shaft 26 and being diametrically freely received by the bumper aperture 30 and entering the socket in the rearward end of the shaft 26, is provided with a half round head 42 at its rearward end abutting the rearward surface of the bumper 16.

The shaft 40 is provided with a transverse aperture adjacent the forward surface of the bumper 16 which receives the hasp of a lock 44 to prevent unauthorized access to the shaft 26.

Additionally, a relatively short length of sleeve material having an inside diameter freely surrounding the shaft 40 and a length substantially equal with the spacing between the forward surface of the bumper 16 and the rearward limit of the cross frame member 22 surrounds the shaft 40, thus, preventing access by an unauthorized person to the periphery of the shaft 40 and limiting the space adjacent the lock 44 to such an extent that it would be unlikely that a bolt cutter or the like, not shown, could access the hasp of the lock.

Prior to installing the shaft 40 and the sleeve 46, an elongated sleeve 48 having an inside diameter greater than the outside diameter of the shaft 26 and a length substantially equal to the spacing between the hoist unit 20 and the forward limit of the rearward cross frame member 22, is placed around the shaft 26, and is angularly rotatable relative thereto, thus precluding access to the shaft 26, as by a pipe wrench or the like, not shown, for angularly rotating the shaft 26 by an unauthorized person.

Obviously the invention is susceptible to changes or alterations without defeating its practicability. Therefore, I do not wish to be confined to the preferred embodiment shown in the drawings and described herein.

I claim:

1. In an anti-theft apparatus for precluding access to the actuating shaft and lock of a vehicle spare tire hoist mounted below the rear end portion of the frame forwardly of the rear bumper, said actuating shaft extending generally horizontally and longitudinally between the hoist and a rearward frame cross member spaced forwardly of the bumper, said actuating shaft having a socket in its rearward end portion and said bumper having an opening admitting one end portion of a wrench or hand crank engageable with the actuating shaft for angular rotation of the latter, the improvement comprising:

locking shaft means including a rod having a transverse aperture projecting through the bumper and into the actuating shaft socket;

a first coextensive sleeve loosely surrounding the actuating shaft; and, a second sleeve substantially equal in length with the spacing between said bumper and the rearward frame cross member and loosely surrounding said rod.

2. The combination according to claim 1 and further including:

a lock having a hasp inserted into the rod transverse aperture.

3. The combination according to claim 2 and further including:

a substantially half-round head on said rod for maintaining the adjacent end portion of said rod within the bumper aperture and precluding wrench driven angular rotation of said rod.

4. In an anti-theft apparatus for precluding access to the actuating shaft and lock of a vehicle spare tire hoist mounted below the rear end portion of the frame forwardly of the rear bumper, said actuating shaft extending generally horizontally and longitudinally between the hoist and a rearward frame cross member spaced forwardly of the bumper, said actuating shaft having a socket in its rearward end portion and said bumper having an opening admitting one end portion of a wrench or hand crank engageable with the actuating shaft for angular rotation of the latter, the improvement comprising:

locking shaft means including a rod having a transverse aperture projecting through the bumper and into the actuating shaft socket;

a first sleeve loosely surrounding the actuating shaft and substantially coextensive with the spacing between the hoist and the rearward frame cross member;

a lock adjacent the bumper and secured to the rod through its transverse aperture;

a second sleeve substantially equal in length with the spacing between said lock and the rearward frame cross member and loosely surrounding said rod; and, a substantially half-round head on said rod for maintaining the adjacent end portion of said rod within the bumper aperture and precluding wrench driven angular rotation of said rod.

* * * * *